United States Patent [19]

Hasbun

[11] Patent Number: 5,829,013
[45] Date of Patent: Oct. 27, 1998

[54] MEMORY MANAGER TO ALLOW NON-VOLATILE MEMORY TO BE USED TO SUPPLEMENT MAIN MEMORY

[75] Inventor: Robert N. Hasbun, Shingle Springs, Calif.

[73] Assignee: Intel Corporation, Santa Clara, Calif.

[21] Appl. No.: 578,474

[22] Filed: Dec. 26, 1995

[51] Int. Cl.⁶ .............................. G06F 12/02; G06F 12/10
[52] U.S. Cl. ............................ 711/103; 711/102; 711/165
[58] Field of Search ..................................... 395/430, 492; 711/103, 165, 102

[56] References Cited

U.S. PATENT DOCUMENTS

| 5,333,292 | 7/1994 | Takemoto et al. | 711/103 |
| 5,596,738 | 1/1997 | Pope | 711/103 |
| 5,603,056 | 2/1997 | Totani | 711/103 |
| 5,673,417 | 9/1997 | Liao | 711/165 |

OTHER PUBLICATIONS

Dipert, Brian and Markus Levy, "Designing with Flash Memory", Annabooks 1994; p. 246, Apr. 1994.
Maurice J. Bach, "The Design of the Unix Operating System", Prentice–Hall, Inc 1986; pp. 285–306, Dec. 1986.

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

Method and apparatus for executing a program stored in a non-volatile memory are disclosed. A method of executing a program includes the step of initiating execution of a program stored in a non-volatile memory. An exception is generated if a program command attempts to write to a location within the non-volatile memory. In response to the exception, a portion of the contents of the non-volatile memory including the location is relocated to a main memory with a program status of read/write/execute. The program is restarted at the program command causing the exception. An apparatus for executing a program stored in a non-volatile memory includes a main memory. The non-volatile memory is coupled to a main memory bus of the main memory. The program stored in the non-volatile memory has a read/execute program status. A processor is coupled to the main memory bus. An exception is generated during the processor execution of the program if a program command attempts to write to a location within the non-volatile memory. A portion of the program including the location is relocated to the main memory with a status of read/write/execute in response to the exception. Program execution is subsequently restarted at the program command.

20 Claims, 3 Drawing Sheets

MEMORY MANAGER TO ALLOW NON-VOLATILE MEMORY TO BE USED TO SUPPLEMENT MAIN MEMORY

BACKGROUND OF THE INVENTION

1. Field of the Invention

This invention relates to computer systems and, more particularly, to methods and apparatus for utilizing a memory array of non-volatile devices such as flash EEPROM transistor devices as a supplement to main memory in a computer.

2. History of the Prior Art

Recently, flash electrically-erasable programmable read-only memory (EEPROM) storage devices have been used in arrays as a new form of long term storage. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. This charge (typically, a "zero" or programmed condition) or its absence (a "one" or erased condition) may be detected when the device is read.

These arrays may be designed to accomplish many of the operations previously accomplished by other forms of memory in digital systems and especially in computer systems. For example, flash memory is being used to replace various read-only memories (ROM) such as the basic input/output startup (BIOS) memory of a computer system. The ability to program flash memory in place offers substantial advantages for BIOS memory over more conventional EPROM memory which must be removed from the system to be reprogrammed for changes to system components. More recently, flash memory has been used to provide a smaller lighter functional equivalent of an electro-mechanical hard disk drive. Flash memory is useful for this purpose because it may be read more rapidly and is not as sensitive to physical damage as an electro-mechanical hard disk drive. Moreover, flash memory requires no refresh cycle and does not waste power or time on such cycles. Flash hard drive memories are especially useful in portable computers where space is at a premium and weight is extremely important.

In general, a flash EEPROM memory array is divided into blocks of memory cells. Each block is connected so that its memory cells are erased simultaneously. Such an erasure places all of the memory cells in the block into the erased condition. Thereafter, a memory cell may be individually programmed to store data. Since all of the memory transistors of a block of the array are joined so that they may be erased together, a cell in a programmed condition cannot be switched to the erased state until the entire block of the array is erased. Thus, while an electromechanical hard disk drive typically stores information in a first area of the disk and then rewrites that same area of the disk when the information changes, this is not possible with a flash EEPROM memory array without erasing all of the valid information that remains in that block along with the invalid information.

Consequently, in prior art flash memory arrangements, when the information at a data entry changes, the new information is written to a new memory area rather than written over the old data; and the old data is marked as invalid. Then, after a sufficient portion of a block has been marked invalid, the entire block may be erased but only after all valid information remaining in the block is written to the new memory area.

In general, flash memory may be read at the same rate as dynamic random access memory (DRAM) and more rapidly than electro-mechanical hard disk drives because access to a row and column array is more rapid than to a rotating disk. However, because the level of charge required to write a flash device is much greater, writing even to an empty block of flash memory takes somewhat longer than writing to DRAM. Moreover, because changed data may not be directly written over invalid data in a block of flash memory but must be written to a new area, the old data invalidated, and the block with invalid data ultimately erased, the average time to write to flash memory is substantially longer than to write to DRAM.

Thus, although flash memory has been used for many purposes in computer systems, neither flash memory nor some other form of non-volatile memory has been used to supplement main memory. The write time for these non-volatile memories has been considered to be too long to allow the use of such memory as a part of main memory.

However, even though non-volatile memory poses various problems, there are a number of reasons to use non-volatile memory arrays to supplement main memory. A non-volatile memory on the memory bus stores programs which are not lost when power is removed from the system. Thus, the programs are available for execution in memory when power is applied without having to be copied to memory. Application programs and other processes could be stored in and executed directly from a non-volatile memory array. To do so would eliminate the transfer of those application programs between long term memory and main memory and thereby relieve most of the page swapping and attendant loss of speed caused by congestion in the limited space available in main memory. It would also allow applications to begin running more rapidly when they were called.

It would appear to be simple to place non-volatile memory storing an application program on the memory bus. For example, even though write operations to such memory might be slower than to DRAM, it would seem that the processes of an application program need only be read so that an application program could be executed from non-volatile memory. However, some application programs establish and modify data structures and variables positioned within their code. Other programs include self-modifying code to which changes must be written as they occur. Presuming data cannot be written to the memory with sufficient speed to keep up with operations on the memory bus, it would seem to be impossible to position the memory storing such an application program on the memory bus so that the program is executable from the non-volatile memory array.

It is desirable to be able to utilize non-volatile memory to supplement main memory in a computer system by allowing application programs and other processes which include portions which must be written during operation to be stored so that they may be executed from the non-volatile memory array.

SUMMARY OF THE INVENTION

It is, therefore, an object of the present invention to provide apparatus and a method for utilizing non-volatile memory arrays positioned on the memory bus of a computer to store programs and processes which may be executed from the non-volatile memory.

In one embodiment, a method of executing a program includes the step of initiating execution of a program stored in a non-volatile memory. An exception is generated if a program command attempts to write to a location within the non-volatile memory. In response to the exception, a portion of the contents of the non-volatile memory including the location is relocated to a main memory with a program status of read/write/execute. The program is restarted at the program command causing the exception.

In another embodiment, the method includes the step of initiating execution of the program stored in the non-volatile memory. An exception is generated if a program command attempts to write to a location within the non-volatile memory. The contents of a portion of the non-volatile memory including the location are copied to a main memory. Page tables are updated to indicate that the portion is located in main memory. The program is then restarted at the program command.

An apparatus for executing a program stored in a non-volatile memory includes a main memory. The non-volatile memory is coupled to a main memory bus of the main memory. The program stored in the non-volatile memory has a read/execute program status. A processor is coupled to the main memory bus. An exception is generated during the processor execution of the program if a program command attempts to write to a location within the non-volatile memory. A portion of the program including the location is relocated to the main memory with a status of read/write/execute in response to the exception. Program execution is subsequently restarted at the program command.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
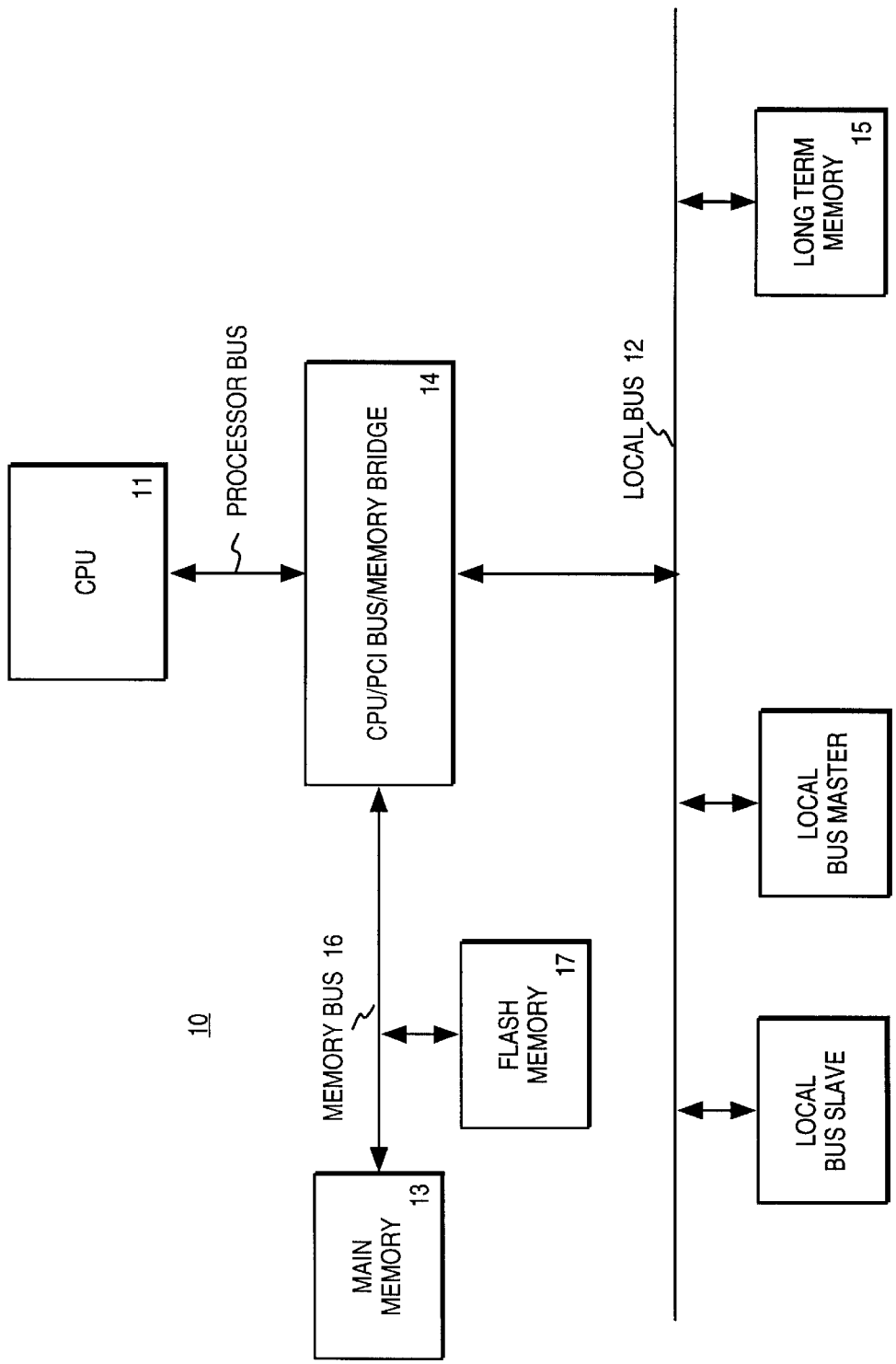
FIG. 1 is a block diagram of a computer system designed in accordance with the present invention.

Referring now to FIG. 1, there is illustrated a computer system 10 configured in accordance with one embodiment of the present invention. The system 10 illustrated includes a central processing unit 11 which executes the various instructions provided to control the operations of the system 10. The central processing unit 11 is typically joined by a processor bus to a bridge circuit 14 which controls access to an input/output bus 12 adapted to carry information between the various components of the system 10. In FIG. 1, the bus 12 is preferably a peripheral component interconnect (PCI) bus or other local bus adapted to provide especially fast transfers of data. This bus is chosen in FIG. 1 for illustrative purposes only. In a typical system 10, various input/output devices are connected to the bus 12 as bus master and bus slave circuits. In the present illustration, for example, long term memory 15 may be joined to the PCI bus 12 as a bus slave circuit. Other input/output devices such as sound boards, frame buffers, and the like may also be joined to the bus 12.

The bridge circuit 14 is also joined by a memory bus 16 to main memory 13. Main memory 13 is typically constructed of dynamic random access memory (DRAM) arranged in a manner well known to those skilled in the prior art to store information during a period in which power is provided to the system 10. In the present invention, a non-volatile memory array 17 designed in accordance with the present invention is also positioned on the memory bus 16 with main memory 13.

Figure 2:
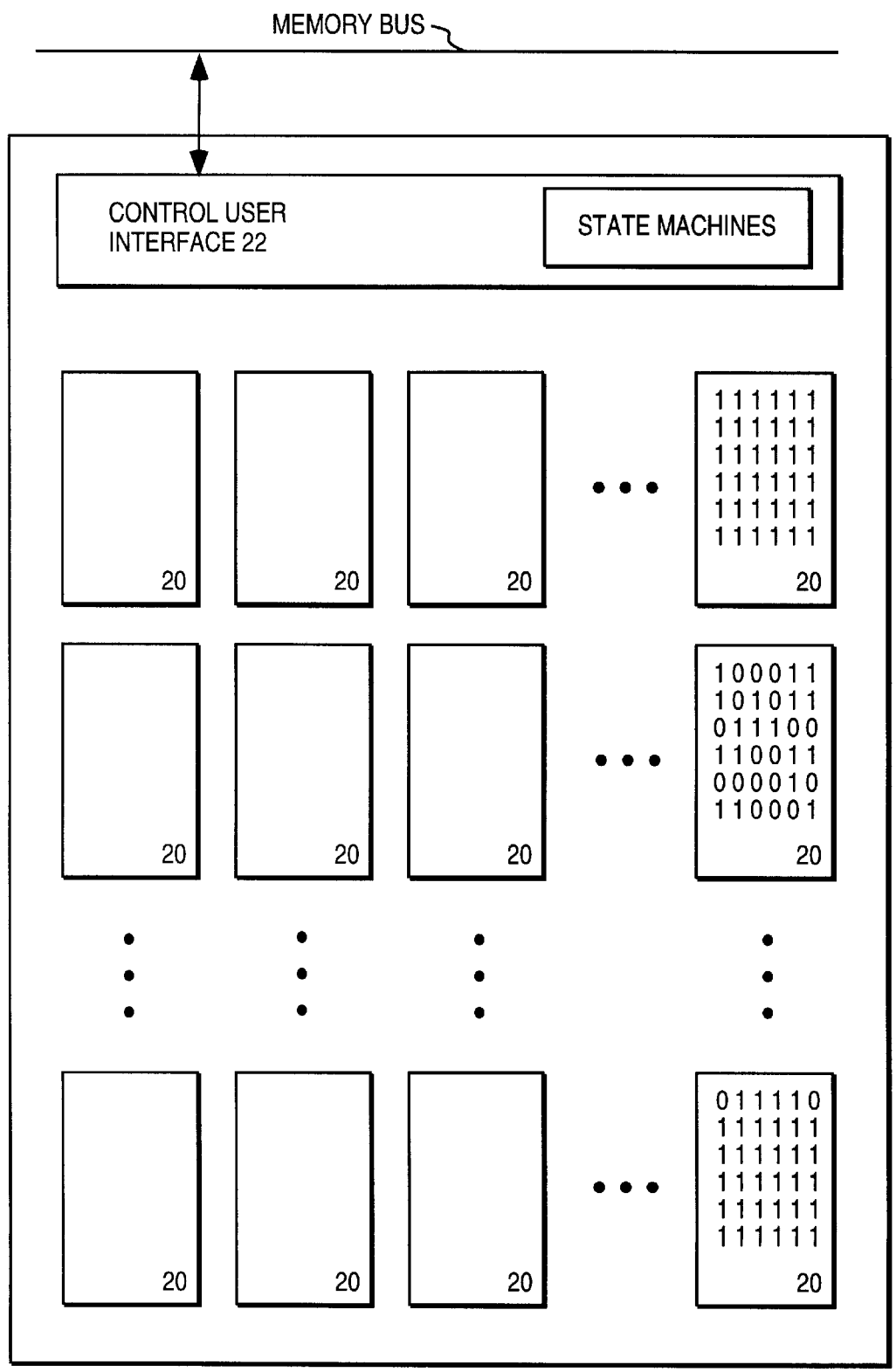
FIG. 2 is a block diagram of a flash EEPROM memory array as typically arranged in accordance with the prior art.

FIG. 2 is a block diagram of a flash EEPROM memory array 17 which has been used as long term memory in various prior art systems. The following description of the array 17 will illustrate why it has been considered impossible to position such a non-volatile memory array on the main memory bus.

The memory array 17 is divided into a number of blocks 20 each of which may be independently erased. Each of these blocks 20 includes flash memory devices joined in logical row and column arrangement. Any particular device is accessed by selecting its row and column in the manner in which data is accessed in dynamic random access memory (DRAM). Access to the blocks of the array 17 is obtained through a command user interface 22 which receives commands, assures that the array is in a proper mode to execute the command received, and executes the commands (typically through the use of various state machines).

As is known to those skilled in the art, flash memory arrays are not written in the same manner as DRAM or other memory. When DRAM or a form of magnetic memory is written, the states of all of the bits being written change essentially together. Flash memory must be erased before it may be rewritten so changed data must be written to erased space in a block. When a word or byte of flash memory is written, the current requirements to charge the floating gates are much higher, so the devices are often pulsed over and over until they arrive at the proper charge condition. Similarly, it takes much more current to discharge the floating gates of the flash devices because the charge is greater and because the erase process necessary before writing first places all flash devices in the charged state and then discharges all of the devices by application of large potential differences. As will be apparent to those skilled in the art, the amount of time involved in each of the writing and erasing processes used for flash EEPROM memory arrays makes writing to a flash EEPROM memory array quite slow compared to the typical DRAM memory used for main memory. For this reason, flash memory has been considered to be unsuitable for storage which involves frequent write update operations.

However, even though the write and erase times are long compared to write and erase times for DRAM, there are a number of reasons to use non-volatile memory to supplement main memory. One primary reason for doing so is to make more space available in main memory. Another is to eliminate the transfer of specific application programs between long term memory and main memory and thereby relieve the page swapping and attendant loss of speed needed to deal with the congestion in the limited space available in main memory. If a non-volatile memory array is positioned on the memory bus so that it may be read as rapidly as the DRAM of main memory, and if an application program is placed in and made executable from the non-volatile memory array, then the application program need not be called from long term memory and placed in main memory in order to run. This leaves more space in main memory for other purposes. The main memory page swapping typically needed to run large applications may be essentially eliminated for applications stored in the non-volatile memory. All of the processes of any such application program would be available in the non-volatile memory, and the processor would not have to spend the time with these housekeeping functions.

A significant number of problems has made placing flash memory storing an application program on the memory bus appear to be impossible to those skilled in the art. First, since writes to flash memory are significantly slower than to DRAM, these writes and attendant erases of the flash memory would appear not to be possible during operating conditions with flash memory positioned on the memory bus without significant slowing of operations. However, it would seem that since the processes of an application program need only be read, an application program could be executed from flash memory. Although it would be useful to be able to write data to the flash memory, such operations could be limited to operations which occur very infrequently such as updating the program.

However, some application programs continually establish and modify data structures and variables positioned within their code segments.

Other programs utilize self-modifying code which is changed as the application is run. Since data can not be continuously written to the flash memory with sufficient speed, it would appear to be impossible to position flash memory storing such an application program on the memory bus and execute the application from the flash memory array.

The present invention allows application programs and processes which require that data be written to their code sections during their execution to be stored in a flash EEPROM or other non-volatile memory array positioned on the memory bus of a computer system and executed from the flash memory array. This is accomplished in the present invention by using the memory management unit (MMU) controlled by the operating system to accomplish a number of unique operations. Typically, a memory management unit is designed to be used by an operating system to allow the addressing of virtual memory. Virtual memory addressing provides access to much greater amounts of memory than are available in main memory by assigning virtual addresses to data wherever it may be stored and translating those virtual addresses to physical addresses when the data is actually accessed. The memory management unit controls the page tables which an application may access and provides the translations between virtual and physical memory using those tables.

A much larger number of memory addresses are provided in a virtual memory system than there are addresses available in main memory. Memory addresses may be assigned by the memory manager of the operating system to different components of the system to allow an application program to address that component directly. Most modern operating systems do not allow these addresses to be assigned to input/output components of the computer system because if they are assigned these addresses an application may write directly to such input/output devices using this facility and thereby avoid many of the protections and most of the security that the operating system is designed to provide.

However, the operating system may assign these addresses to certain components with which there is no problem in bypassing the operating system such as additional memory on the memory bus. Therefore, when a non-volatile memory array is initially placed in a system, a portion of the memory addresses are assigned to the non-volatile memory array. When any program or process is written to the non-volatile memory array, the particular ones of the portion of the memory addresses at which the program is stored are assigned to the program. Once assigned, the operating system, especially the memory management portion of that system, will be aware that these are non-volatile memory array addresses and that these addresses are assigned to the program.

Where an attempt is made by means of some form of input signal (such as operator keyboard input) to run an executable program stored in non-volatile memory array on the memory bus, the operating system must be able to determine from a directory structure or driver that this program exists in the flash memory array to which memory addresses are assigned. Thus, when a program is first called by the operating system, the operating system typically traps the call, looks up the path to the application, and places the addresses associated with that program into the page tables controlled by the memory management unit so that the memory management unit may direct the operations to the appropriate files. By updating the page tables in this manner, the memory management processes of the operating system make sure that the correct addresses in flash and DRAM memory are accessed when any access is attempted.

The loader portion of the operating system uses the address information to find the executable file in the flash memory array. The loader reads the header of the code of the program to determine the address from which the program expects to start executing, to determine the stack segment size for the program, and to determine the data segment size for the program. The loader uses this information to create the stack and data segments in DRAM memory. However, it leaves the code segment address as the memory addresses which are assigned to the program in the flash memory array. The loader also causes the application to be described in the descriptor table for the executable application as read/execute only.

Since the application is described in the descriptor table for the executable application as read/execute only, if the application attempts to write to the non-volatile memory array while it is executing, an exception is generated. The exception is passed to an exception handler designed for an application stored in flash memory on the memory bus that attempts to write to that flash memory. The exception handler is executed by the central processing unit. The exception handler reads from the flash memory that portion of the code addressed by the attempted write access and copies that portion of the code into the DRAM portion of main memory. In one embodiment, the portion copied is the page (typically four kilobytes) including the code to which the write that caused the interrupt was addressed.

In order to accomplish this, it may and probably will be necessary for the memory manager to swap some portion of the data in DRAM main memory out to long term memory using whatever allocation algorithm the operating system utilizes for allocating data between main memory and long term memory in the particular virtual memory system. The memory manager then updates the page tables to reflect these changes.

Once the page addressed by the attempted write access has been written to DRAM, the descriptor table for that application is marked to define that page as read/write/execute; and the program is restarted at the instruction which caused the exception. From this point on, the application can write to the portion of code which was previously read/execute only since the addresses for that portion of the application place it in the DRAM portion of main memory and the descriptor table shows that the portion may be written. Since the attributes of that portion of the program have been changed so that it may be read, written, and executed, the data in that portion of the program, whether data structures, variables, or self-modifying code, may be modified by writing to the page in main memory.

As the program is run, the various files are accessed in the non-volatile memory array and executed. When an attempt is made by the program to access the portion now in DRAM, the addresses determined from the page tables will correctly address the access to the DRAM rather than the flash memory. In this manner, any program or process stored in non-volatile memory array positioned on the memory bus may run even though the program or process contains an area which is written to during operation.

Figure 3:
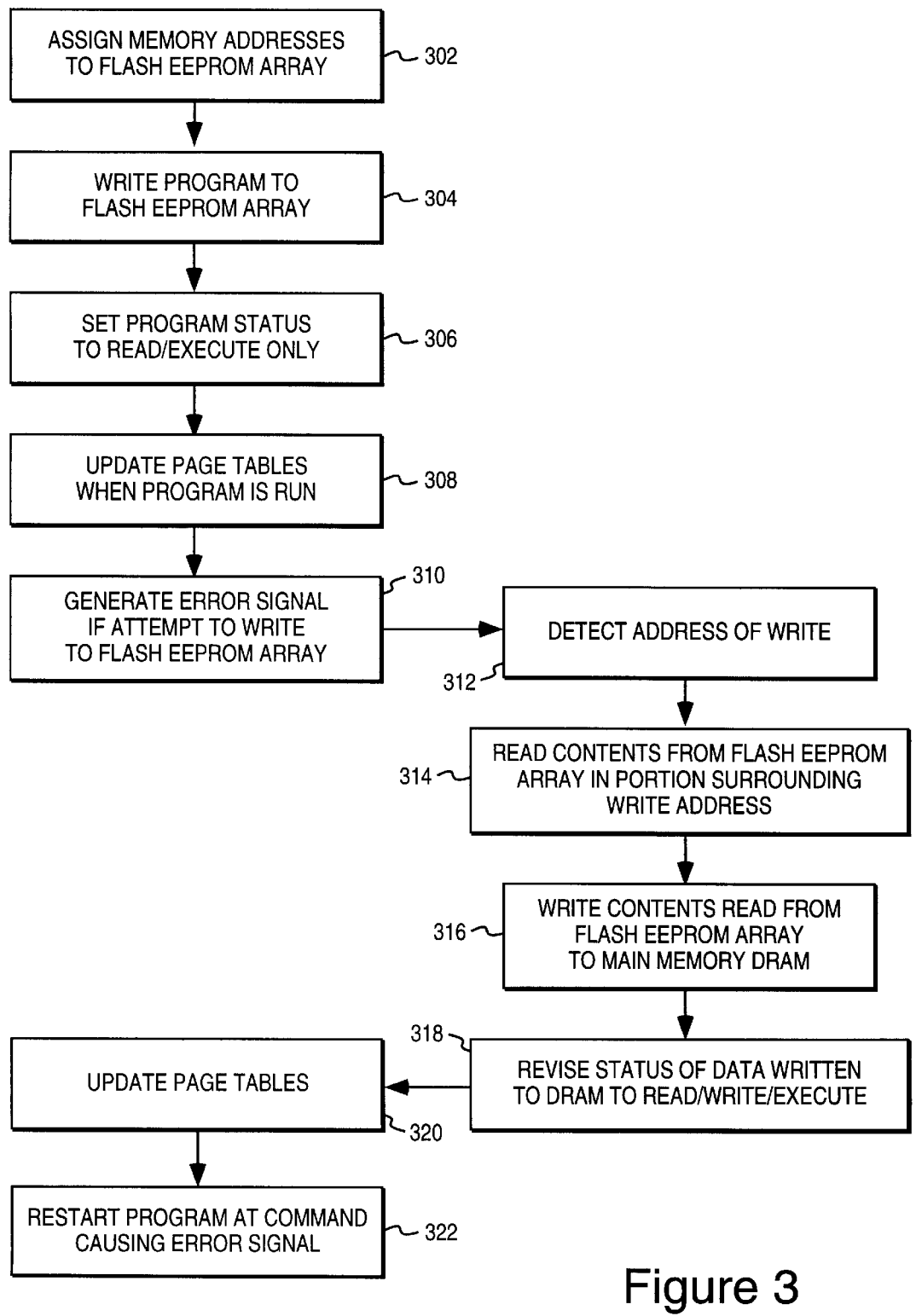
FIG. 3 is a flow chart illustrating a method in accordance with the invention.

FIG. 3 illustrates a flowchart for the process described above. Memory addresses are assigned to the flash EEPROM array in step 302. A program is written to the flash EEPROM array in step 304. The program status is set to read/execute only in step 306. The page tables for memory management unit are updated to reflect the location of the program within the non-volatile memory in step 308 when the program is executed.

An exception or error signal is generated in step 310, if the program attempts to write to the non-volatile memory array while it is executing. In response to the exception, the addresses to be written to are detected in step 312. The contents of the flash EEPROM array in the portion surrounding the write address are read in step 314. These contents are then written to main memory DRAM in step 316. Steps 314–316 thus effectively copies the contents of a portion including the addresses being written to from the non-volatile memory to the main memory. In one embodiment, the portion is the page including the code to which the write that caused the exception.

After writing the contents to DRAM, the status of the data written to DRAM is changed to read/write/execute in step 318. The page tables are updated again in step 320. Updating the page tables effectively relocates the portion in main memory DRAM. Now that the portions to be modified have been relocated to DRAM, the program is restarted at the program command causing the exception in step 322.

In summary, a program is stored in the non-volatile memory array with a status of read/execute only. If a program command attempts to write to a location within the non-volatile memory during execution, a portion of the contents of the non-volatile memory including that location is relocated to main memory DRAM with a program status of read/write/execute. The program can then be restarted at the program command causing the exception.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method of executing a program comprising the steps of:
   a) initiating execution of a program stored in a non-volatile memory;
   b) generating an exception if a program command attempts to write to a location within the non-volatile memory;
   c) relocating a portion of the contents of the non-volatile memory including the location to a main memory in response to the exception; and
   d) restarting the program at the program command.

2. The method of claim 1 wherein step a) further comprises the steps of:
   i) assigning memory addresses to the non-volatile memory;
   ii) writing the program to the non-volatile memory; and
   iii) identifying the memory addresses associated with the program as read/execute only.

3. The method of claim 2 wherein step a)(iii) further comprises the step of updating a descriptor table.

4. The method of claim 2 further comprising the step of:
   iv) updating page tables when the program is executed.

5. The method of claim 1 wherein step c) further comprises the steps of:
   i) reading the portion of the contents of the non-volatile memory;
   ii) writing the portion of the contents to the main memory; and
   iii) updating page tables to indicate the relocated portion.

6. The method of claim 21 wherein step c) further comprises the step of:
   i) swapping an amount of main memory to virtual memory to provide space for the portion.

7. The method of claim 1 wherein the non-volatile memory comprises a flash electrically erasable programmable read only memory array.

8. The method of claim 1 wherein step c) further comprises the step of:
   i) relocating the portion of the contents of the non-volatile memory including the location to the main memory with a program status of read/write/execute.

9. A method of executing a program, comprising the steps of:
   a) initiating execution of a program stored in a non-volatile memory;
   b) generating an exception if a program command attempts to write to a location within the non-volatile memory;
   c) copying contents of a portion of the non-volatile memory including the location to a main memory in response to the exception;
   d) updating page tables to indicate that the portion is located in main memory; and
   e) restarting the program at the program command.

10. The method of claim 9 wherein step a) further comprises the steps of:
   i) assigning memory addresses to the non-volatile memory;
   ii) writing the program to the non-volatile memory; and
   iii) setting a program status of the program to read/execute only.

11. The method of claim 10 wherein step a)(iii) further comprises the step of updating a descriptor table.

12. The method of claim 10 further comprising the step of:
   iv) updating the page tables when the program is executed.

13. The method of claim 9 wherein step d) further comprises the step of:
   i) setting the program status to read/write/execute.

14. The method of claim 9 wherein step c) further comprises the step of:
   i) swapping an amount of main memory to virtual memory to provide space for the portion.

15. The method of claim 9 wherein the non-volatile memory comprises a flash electrically erasable programmable read only memory array.

16. An apparatus comprising:
   a main memory;
   a non-volatile memory coupled to a main memory bus of the main memory, the non-volatile memory storing a program having a program status of read/execute;
   a processor coupled to the main memory bus, wherein an exception is generated during the processor execution of the program if a program command attempts to write to a location within the non-volatile memory, wherein a portion of the program including the location is relocated to the main memory with a status of read/write/execute in response to the exception, wherein the program execution is subsequently restarted at the program command.

17. The apparatus of claim 16 wherein the non-volatile memory comprises flash electrically erasable programmable read only memory.

18. A method of executing a program, comprising the steps of:
   a) initiating execution of a program stored within a non-volatile memory;
   b) performing the following steps, if a program command attempts to modify a page of the non-volatile memory;
      i) halting execution of the program;
      ii) copying the page of non-volatile memory to a main memory;
      iii) remapping the page of non-volatile memory to the main memory; and
      iv) resuming execution of the program at the program command.

19. The method of claim 18 wherein step b)(iii) further comprises the step of modifying a program descriptor table to define the remapped page as read/write/execute.

20. The method of claim 18 wherein step a) further comprises the step of setting a program descriptor table to define the non-volatile memory storing the program as read/execute only.

* * * * *